June 12, 1951  J. M. MARZOLF  2,556,204
REVERSE CURRENT CUTOUT RELAY SYSTEM
Filed Feb. 3, 1949  2 Sheets-Sheet 1
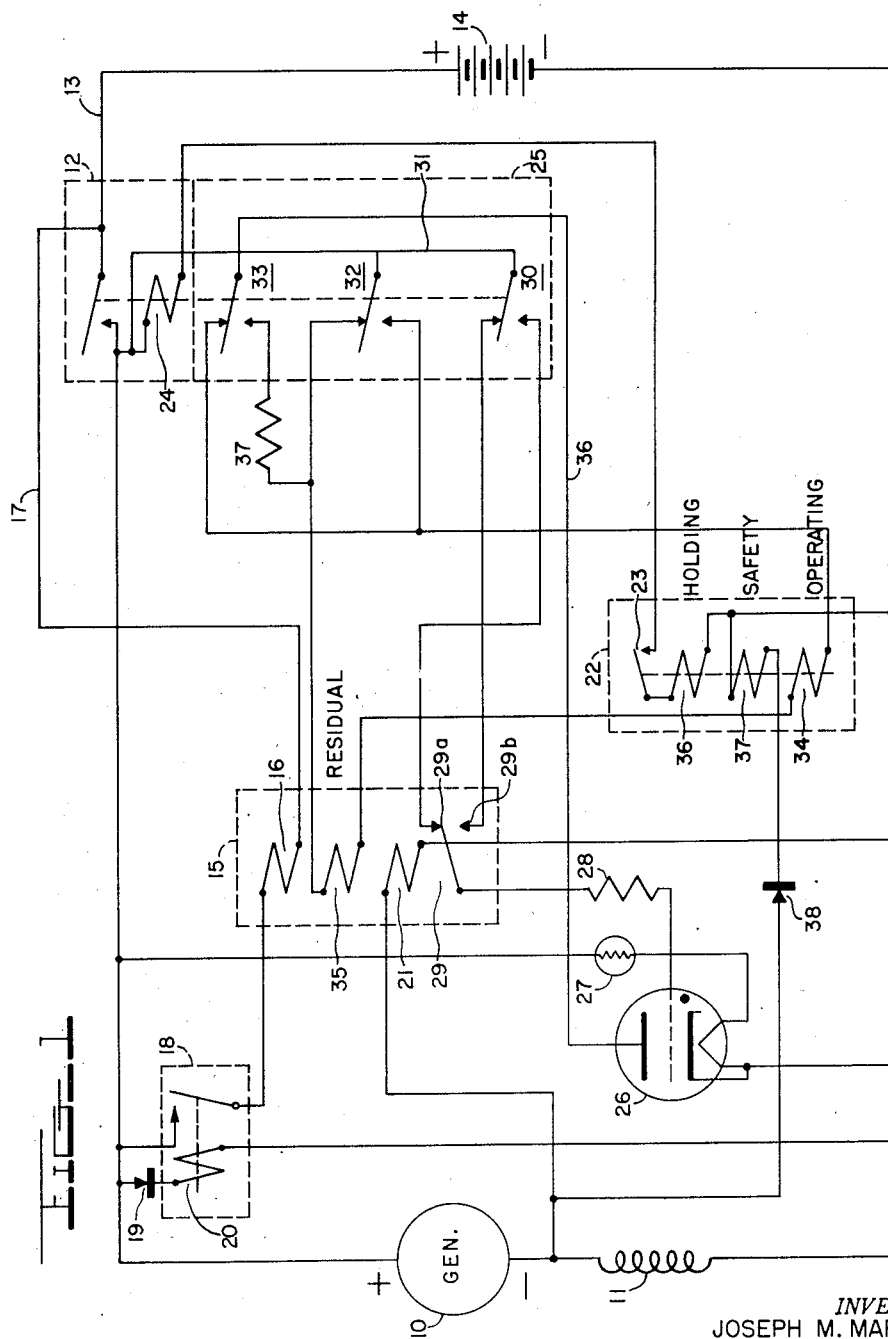
INVENTOR.
JOSEPH M. MARZOLF
BY
*M. A. Hayes*
ATTORNEY

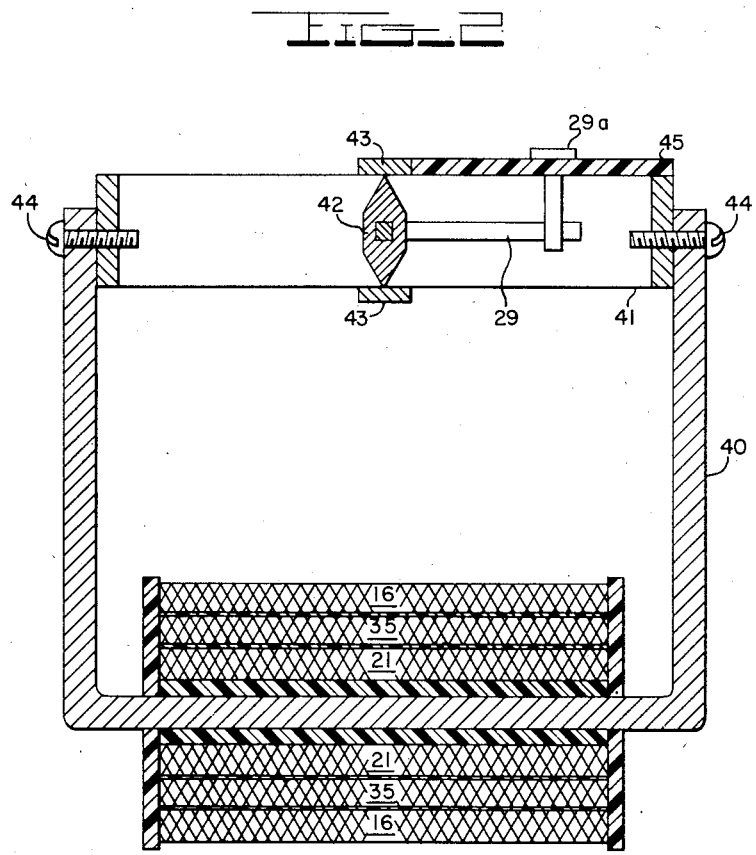

Patented June 12, 1951

2,556,204

UNITED STATES PATENT OFFICE 2,556,204

REVERSE CURRENT CUTOUT RELAY SYSTEM

Joseph M. Marzolf, Washington, D. C.

Application February 3, 1949, Serial No. 74,284

7 Claims. (Cl. 175—294)

(Granted under the act of March 3, 1883, as amended April 30, 1928; 370 O. G. 757)

The present invention relates to reverse current cut-out relays and is particularly concerned with the problem of providing a new and improved reverse current relay circuit for aircraft electrical systems.

The purpose of reverse current relay circuits is obstensibly that of connecting the generator of the electrical system to the main supply bus when conditions are such that the generator is capable of delivering power to the bus and of disconnecting the generator from the bus when the latter supplies power to the generator.

In the past, cut-out relay circuits designed for this purpose have, in general, employed a multiplicity of conventional type electromagnetic relays at least one of which is included for the purpose of energizing and for de-energizing the solenoid associated with the main contactors for connecting the generator to the main supply bus. In general, these relays are of the type which include an armature biased to one position by a spring, and movable to a second position when the current flowing through the relay winding is sufficient to overcome the tension of the spring. When relays of this general nature are subjected to wide variations in temperature and pressure, such as that encountered in aircraft installations, the spring will contract or expand to vary the amount of tension applied to the relay armature, thus giving rise to erratic or unpredictable operation of the relays. As a result of this phenomenon, the main contactors frequently close before the generator voltage has attained a desired maximum level and open after the generator voltage has dropped below the desired minimum level, thus causing extremely unreliable operation of the cut-out relay circuit.

Also in direct current electrical systems, with which the invention deals in particular, the several electromagnetic relay elements which make up the reverse current cut-out relay circuit, will possess a certain degree of residual magnetism caused by the direct current flowing through the relay windings. The residual magnetism, of course, varies to a certain extent with the amount of current presently flowing through the relay winding, and this current in turn is subject to the usual variations dependent upon the operating conditions of the circuit. As a result, the amount of current required to open or close the relay may well vary considerably from one cycle of operation to the next, thus further aggravating the unreliability of the cut-out relay circuit.

It is accordingly an object of this invention to provide a new and improved reverse current cut-out relay circuit in which the abovementioned difficulties are obviated.

It is another object of this invention to provide a reverse current relay circuit wherein the main contactors of the system are closed upon the attainment of a small difference in potential between the main bus and the generator and opened in response to the flow of a small current from the bus to the generator.

It is another object of this invention to provide a new and useful permanent magnet type relay.

Other objects and features of this invention will become apparent upon a careful consideration of the following detailed description when taken together with the accompanying drawings.

Fig. 1 is a detailed circuit diagram of the preferred embodiment of the present invention, and Fig. 2 is a simplified cross sectional view of one embodiment of the permanent magnet relay used in the circuit of Fig. 1.

Briefly, the present invention includes a solenoid actuated contactor for connecting and disconnecting the generator to the main bus, and a control circuit for energizing the solenoid actuated contactor when the voltage of the generator exceeds the voltage of the bus by a predetermined amount and for de-energizing the same when the bus feeds a predetermined small current to the generator. The control circuit itself comprises a pilot relay disposed in the circuit of the solenoid actuated relay for opening and closing the circuit of the latter; a gas tube trigger circuit for providing momentary energization of the pilot relay, and a novel permanent magnet control element for triggering the gas tube.

The permanent magnet control element includes a small magnetized armature pivotally suspended in the field of a magnetized yoke. The residual magnetism of the yoke holds the armature in one position of contact. Wound around the yoke is a first field coil which is connected across the main contactor of the system. This coil is wound in such a direction that when the generator voltage exceeds the bus voltage by a predetermined small amount the small forward current which flows through the coil overcomes the residual magnetism of thhe yoke and reverse the polarity of the same. At the instant this occurs the armature of the permanent magnet control element rotates to a second contact position to fire the gas tube trigger stage, which in turn energizes the pilot relay. The latter operates to close the circuit of the solenoid actuated contactor and the generator is connected to the main bus.

Also wound around the yoke of the permanent magnet control element is a second field coil. This coil is connected across a suitable voltage dropping element in series with the generator, usually the series field winding of the generator, and is wound in such a direction that under conditions of normal forward current flow the direction of the field produced by this winding is such as to hold the armature in the second contact position. If reverse current should flow, however, the current flow through the second coil also reverses and thereby restores the original field polarity to the control element yoke, causing the permanent magnet armature to rotate back to the first contact position. At this instant the gas tube trigger stage is again fired to this time de-energize the pilot relay and open the circuit of the solenoid actuated contactor, and thus disconnect the generator from the main bus.

Referring now in particular to Fig. 1, reference numeral 10 pertains to the generator of the electrical system, 11 the associated series field winding, 12 the solenoid contactor, 13 the hot side of the main bus, and 14 the direct current storage source of the system. The permanent magnet control element is designated in general at 15. One end of the first field winding 16 of the control element 15 is connected via lead 17 to the positive supply bus 13, while the other end is connected through the contacts of an auxiliary relay 18 to the positive side of the generator 10. The winding 20 of the auxiliary relay 18 is connected across the generator 10.

Relay 18 is in the nature of a circuit refinement and may be omitted if desired. Relay 18 is included for the purpose of simplifying the design of winding 16 in the permanent magnet control element and to prevent "burn out" of this winding should the generator voltage build up in the wrong direction. To this end, relay 18 is polarized as by the insertion of a unilateral impedance element 19 in series with the winding 20 so that relay 18 is only capable of closing when the voltage across the generator is of the proper polarity and magnitude.

The second field winding of the permanent magnet control element 15 is designated at 21 and is connected across the series field winding 11 of the generator.

The pilot relay is shown in general at 22 with the contacts 23 thereof located in series circuit relation with the solenoid winding 24 of the main contactor 12. The main contactor has associated therewith a three pole double throw switch 25 added for the purpose of assisting in the control of the gas tube trigger stage 26.

The filament 27 of the gas tube is connected in series with a resistance ballast 27 across the generator 10. The ballast 27 is, of course, to compensate for the fluctuations in voltages occurring at the output of the generator 10. The grid of the tube 26 is connected to the armature 29 of the permanent magnet control element via grid limiting resistance 28. The stationary contacts 29a and 29b of the permanent magnet control element 15 are in turn connected to the contacts of the lower section 30 of the three section double throw switch 25. The contactor of this section is in turn connected to generator 10 via lead 31. Similarly, the plate of tube 26 receives its operating potential through lead 36, switch section 33, of switch 25, operating winding 34 of the pilot relay 22, a third field winding 35 of the control element 15, switch section 32 of switch 25 and lead 31 to the same side of the generator 10. The purpose of the third field winding is to restore the residual magnetism to the yoke of the control element 15 as hereinafter described.

To explain the operation of the system, assume that the main contactor 12 is open and the generator voltage is zero. In this condition, the auxiliary relay 18 is also open and there is no connection either across the battery 14 or between the battery and generator, and no standby power is consumed. The triple pole double throw switch 25 is in the upper position as shown and the residual magnetism of the yoke in the permanent magnet control element 15 is such as to hold the armature 29 in the position shown. When the generator voltage increases in the proper direction to some predetermined voltage lower than the battery 14 the auxiliary relay 18 closes. In 28 volt aircraft electrical systems this predetermined voltage is approximately 20 volts. Since the battery voltage is still higher than the generator voltage, current will flow through the first field winding 16 of the permanent magnet control element in the reverse direction to hold the permanent magnet armature 29 in the position indicated in the drawing. As the generator voltage continues to rise it reaches a value, say .2 volt, higher than the battery voltage at which time the flux produced by the first field winding 16 is sufficient to overcome the residual magnetism of the yoke between whose poles the permanent magnet armature 29 is suspended. This causes the permanent magnet to rotate and make instantaneous closure with the lower contact 29b, thereby impressing the full positive voltage of the generator on the grid of tube 26, through grid limiting resistor 28, lower contact 29b, switch section 30 and lead 31. At the instant that such contact is made, tube 26 fires and conduction therein continues regardless of subsequent grid voltage. This contact does not need to be continuous to cause the tube to fire, therefore no contact springs are required on the permanent magnet armature and the mechanical force developed between the permanent magnet armature and the yoke can be very small. Also, the amount of over-voltage between the generator and the battery required to operate the control element can be very small and hence the generator is thus connected to the bus almost as soon as it is capable of delivering power to the electrical system.

The plate current surge of the gas tube 26 flows from the positive side of the generator down through lead 31, switch section 32, third field winding 35 of the control element 15, operating winding 34, and switch section 33 through the tube and back to the generator. This current flowing through winding 34 of the pilot relay closes the associated contacts 23 to complete the circuit of the main contactor solenoid 24 and thus closes the main contactor 12 to connect the generator to the supply bus. The current that flows through the main solenoid 24 also flows through a holding coil 36 on the pilot relay 22 to thus hold the contacts 23 in a closed position.

When the main contactor 12 closes it mechanically throws the three pole double throw switch to the lower position, and in passing from one position to the other, switch sections 32 and 33 instantaneously open the plate circuit of tube 26 thereby extinguishing the same, but the pilot relay 22 and the main contactor remain closed.

The armature 29 of the permanent magnet control element 15 is now in the lower position and is held there by the action of second field winding 21 and the residual magnetism produced in the magnetic yoke by the gas tube plate current flowing through winding 35 of the control element 15. As long as current flows from the generator to the bus the field produced by winding 21 is of the proper polarity to hold the permanent magnet armature in the lower position.

Assume now that the generator voltage drops below the battery voltage and current, of course, then flows from the battery to the generator. This reverses the voltage drop across the series field winding 11 of the generator with the magnitude of the drop being proportional to the magnitude of the reverse current. When the reverse current reaches an arbitrary value dependent upon the design of the winding 21, the polarity of the field produced by said winding will reverse thus causing the permanent magnet armature 29 to rotate to the upper position and impress a positive voltage on the grid of the gas tube 26 through contact 29a and switch section 30. This again causes the tube 26 to fire. This time however and due to the conjoint action of switch sections 32 and 33 the plate current of tube 26 passes through the operating coil 34 of the pilot relay 22 in the opposite direction overcoming the effect of the holding coil 36 allowing the pilot relay and main contactor 12 to open. The plate current this time flowing through the operating coil 34 of the pilot relay 22 is limited by a resistance 37 to prevent the pilot relay from closing by current flowing in this direction. In other words, the current through the operating coil 34 is just sufficient to overcome the holding coil, but not sufficient to close the pilot relay from the open position.

As the main contactor opens, it mechanically returns the three pole double throw switch 25 to the upper position, and in so doing the switch sections 32 and 33 open the plate circuit of tube 26 to extinguish the tube so that the cycle may thereafter be repeated.

It will be noted from the foregoing that the third winding 35 of the permanent magnet control element 15 is serially inserted in the path of plate current flow of tube 26. The purpose of this winding is to endow the yoke with a given residual flux density each time the gas tube is fired so as to insure uniform operation of the control element regardless of the magnetic history of the yoke. The design of this coil is not critical but should be such as to carry the flux density of the yoke well above saturation for the lowest value of residual coil current of the gas tube that will be encountered with the operating coil 34 of the pilot relay, the third winding 35, and the limiting resistor 37 all included in the plate circuit of the tube and for minimum plate voltage.

By insuring that the flux density of the yoke exceeds saturation on each operation of the control element 15, the yoke will follow substantially the same hysteresis loop and the control element will operate on the same point of such loop each time.

In addition, a high value of residual flux acts to prevent spurious operation under conditions of shock and vibration at no load condition.

As a precautionary measure, a third coil 37 can be wound on the pilot relay 22 and connected in series with a polarizing rectifier 38 across the generator field winding 11 in order to open the pilot relay under very large reverse currents in the main circuit. This coil is preferably designed to operate the pilot relay at high values of reverse current, and normally, it will not operate the cut-out at all. It is merely included as a safety feature to insure that the cut-out will open even though the gas tube were to burn out while the main contactors were closed. Also this coil is preferably designed with a long time constant so that pilot relay will have sufficient time to open regardless of the steepness of the reverse current surge before the safety coil current reaches a value sufficiently high to hold the relay closed by reverse current. Thus the pilot relay should open, mechanically, very rapidly and the current in the safety coil 37 should rise relatively slowly regardless of the steepness of the surge voltage applied across its terminals.

It will be recognized from the foregoing that the operation of connecting and disconnecting the generator to the main bus is initiated in each instance by the action of the control element 15 and that since the latter involves no springs the aforementioned disadvantages encountered in conventional cut-out relays are largely overcome by this invention. Also since the third field winding 35 wound on the yoke of the control element insures saturation of the yoke, the voltage levels at which the generator is connected and disconnected from the main bus are uniform from one cycle of operation to the next.

In addition to the above it will be recognized that the cut-out can be made small and light since it operates on pulse techniques and thus the operating coil 34 of the pilot relay 22 and the third winding 35 of the control element 15 can be over loaded instantaneously. Furthermore, the holding coil on the pilot relay although designed for continuous operation, only operates when the relay is closed under conditions of zero air gap and would thus be smaller than the conventional relay coil.

The power losses in the system are low since no additional shunts or other devices are required in the power circuit, and the only appreciable power input is that required to heat the heater of the trigger stage.

Fig. 2 shows in cross section a typical embodiment of the permanent magnet control element 15. As herein exemplified, control element 15 comprises a laminated U-shaped yoke member 40 on which the three field windings 16, 21 and 35 are wound. The armature 29 is a simple bar magnet pivotally supported at its mid-point by a brass or other non-magnetic pivot bearing 42 mounted between two non-magnetic supporting bars 43. The latter are carried by a non-magnetic ring 41, which is, fastened to the pole pieces of the yoke 40 by a pair of mounting screws 44. The contacts 29a and 29b of the control element are in the form of brass studs symmetrical supported on each side of the plane of the yoke by a suitable insulating card 45 mounted on top of the ring 41. Only contact 29a is shown in this figure since the other contact has been removed by sectioning.

The yoke 40 is preferably made from a material having low magnetic coercive force so that a small applied current of the proper polarity will operate the same.

The armature is preferably made from a material having high coercive force and should be made as light and small as possible. The bearing mount for the armature should be as nearly frictionless as possible and the armature should be carefully balanced so as to prevent spurious operation when the system is subjected to shock or vibration.

Although I have shown and described only one specific embodiment of the present invention it will be understood that I am fully aware of the many modifications possible thereof. Therefore, this invention is not to be limited except as herein indicated by the scope of the specification and claims.

The invention described herein may be manufactured and used by or for the Government of the United States of America for governmental purposes without the payment of any royalties thereon or therefor.

What is claimed is:

1. A relay mechanism for controlling the connection and disconnection of a generator to a supply bus, comprising in combination, a control switch having a magnetized yoke member and a permanent magnet contactor element having a fixed magnetic polarity pivotally suspended in the field of the yoke and biased to a first position under the influence of the residual magnetism of the yoke but movable to a second position of contact in response to a reversal in magnetic polarity of the yoke, a field winding wound around said yoke, means connecting the field winding between the generator and the supply bus such that current flow from the generator to the supply bus will reverse the polarity of the residual magnetism of the yoke, means including a second field winding wound around said yoke responsive to a small flow of current from the supply bus to the generator to induce the original magnetic polarity in the yoke, and means including a trigger circuit responsive to the second and first positions of contact of said contactor element to respectively connect and disconnect the generator to the supply bus.

2. A relay mechanism for controlling the connection and disconnection of a generator to a supply bus, comprising in combination, a control switch having a magnetized yoke member and a permanent magnet contactor element having a fixed magnetic polarity pivotally suspended in the field of said yoke and biased to one position of contact under the influence of the residual magnetism of the yoke but movable to a second position of contact in response to a reversal in magnetic polarity of said yoke, a first field winding wound around said yoke, means connecting said field winding between the generator and the supply bus so that current flow from the generator to the supply bus will reverse the polarity of said yoke and cause said armature to rotate to the second position of contact, means including a second field winding wound around said yoke and responsive to a small current flow from the supply bus to the generator to restore the original magnetic polarity to the yoke, and means responsive to the second position of the contactor to connect the generator to the bus and further responsive to the first position of contact to disconnect the generator from the supply bus.

3. A relay mechanism for controlling the connection and disconnection of a generator to a supply bus, comprising in combination, a control switch having a magnetized yoke member and a permanent magnet contactor element having a fixed magnetic polarity pivotally suspended in the field of said yoke and biased to one position of contact under the influence of the residual magnetism of the yoke but movable to a second position of contact in response to a reversal in the magnetic polarity of the yoke, a first field winding wound around said yoke, means connecting said field winding between the generator and the supply bus so that current flow from the generator to the supply bus will reverse the polarity of said yoke and cause said armature to rotate to the second position of contact, means including a second field winding wound around said yoke and responsive to a small current flow from the supply bus to the generator to restore the original magnetic polarity to said yoke, a contactor device for connecting and disconnecting the generator to the supply bus, and means responsive to the second and first positions of said switch contactor to respectively close and open said contactor device.

4. A relay mechanism for controlling the connection and disconnection of a generator to a supply bus, comprising in combination, a control switch having a magnetized yoke member and a permanent magnet contactor element pivotally suspended in the field of said yoke, said contactor being biased to one position of contact under the influence of the residual magnetism of the yoke and movable to a second position of contact in response to a reversal in magnetic polarity of said yoke, a first field winding wound around said yoke, means connecting the field winding between the generator and the supply bus so that current flow from the generator to the supply bus will operate to reverse the magnetic polarity of the yoke and cause said armature to rotate to the second position of contact, means including a second field winding wound around said yoke responsive to a small current flow from the supply bus to the generator to restore the original magnetic polarity to said yoke, a gaseous discharge device disposed to be triggered in response to each change in contact position of said contactor, and control circuit means responsive to successive triggerings of said gaseous discharge device to alternately connect and disconnect said generator to said supply bus.

5. A relay mechanism for controlling the connection and disconnection of a generator to a supply bus, comprising in combination, a control switch having a magnetized yoke member and a permanent magnet contactor element pivotally suspended in the field of said yoke, said contactor being biased to one position of contact under the influence of the residual magnetism of the yoke and movable to a second position of contact in response to a reversal in magnetic polarity of said yoke, a first field winding wound around said yoke, means connecting the field winding between the generator and the supply bus so that current flow from the generator to the supply bus will operate to reverse the magnetic polarity of the yoke and cause said armature to rotate to the second position of contact, means including a second field winding wound around said yoke responsive to a small current flow from the supply bus to the generator to restore the original magnetic polarity to said yoke, a gaseous discharge device disposed to be triggered in response to each change in contact position of said contactor, and control circuit means responsive to successive triggerings of said gaseous discharge device to alternately connect and disconnect said generator to said supply bus, and a third field winding wound around said yoke and located in the path of discharge current flow operative to produce magnetic saturation in said yoke each time said gaseous discharge device is triggered.

6. A relay mechanism for controlling the connection and disconnection of a generator to a supply bus, comprising in combination, a control switch having a magnetized yoke member and a permanent magnet contactor element having a fixed magnetic polarity pivotally suspended in the field of the yoke, and biased to a first position under the influence of the residual magnetism of the yoke but movable to a second position of contact in response to a reversal in magnetic polarity of the yoke, means responsive to a small current flow from the generator to the supply bus to reverse the magnetic polarity of the yoke, a solenoid contactor for connecting said generator to said supply bus, and a trigger circuit interconnected between said permanent magnet contactor element and said solenoid contactor responsive to the second position of contact to actuate said solenoid contactor.

7. A relay mechanism for controlling the connection and disconnection of a generator to a supply bus, comprising in combination, a control switch having a magnetized yoke member and a permanent magnet contactor element having a fixed magnetic polarity pivotally suspended in the field of the yoke and biased to first position of contact under the influence of the residual magnetism of the yoke, but movable to a second position of contact in response to a reversal in magnetic polarity of the yoke, means including a control element connected between the generator and the supply bus operative responsive to a small current flow from the generator to the supply bus to reverse the magnetic polarity of the yoke, means responsive to a small current flow from the supply bus to the generator to restore the original magnetic polarity to the yoke, a solenoid contactor for connecting said generator to said supply bus, and a trigger circuit interconnected between said permanent magnet contactor element and said solenoid contactor responsive to the second position of contact to actuate said solenoid contactor and further responsive to the first position of contact to deactuate said solenoid contactor.

JOSEPH M. MARZOLF.

REFERENCES CITED

The following references are of record in the file of this patent:

UNITED STATES PATENTS

| Number | Name | Date |
|---|---|---|
| 1,252,312 | Warren | Jan. 1, 1918 |
| 1,746,726 | Creveling | Feb. 11, 1930 |
| 1,750,156 | Blake | Mar. 11, 1930 |
| 1,837,188 | Keller | Dec. 22, 1931 |
| 1,871,787 | Goldsborough | Aug. 16, 1932 |
| 2,020,952 | Lenehan | Nov. 12, 1935 |
| 2,437,726 | Davis | Mar. 16, 1948 |
| 2,451,953 | Ingram | Oct. 19, 1948 |
| 2,462,892 | O'Brien | Mar. 1, 1949 |
| 2,467,720 | Austin | Apr. 19, 1949 |